(12) United States Patent
Hanning et al.

(10) Patent No.: US 7,891,273 B2
(45) Date of Patent: Feb. 22, 2011

(54) INSULATION STRIPPING TOOL

(75) Inventors: Guenter Hanning, Detmold (DE);
Christian Heggemann, Detmold (DE);
Detlev Hetland, Detmold (DE); Thomas Koester, Schlangen (DE); Andreas Wedler, Detmold (DE); Siegfried Storm, Schlangen (DE)

(73) Assignee: Weidmueller Interface GmbH & Co. KG, Detmold (DE)

( * ) Notice: Subject to any disclaimer, the term of this patent is extended or adjusted under 35 U.S.C. 154(b) by 87 days.

(21) Appl. No.: 12/316,487

(22) Filed: Dec. 12, 2008

(65) Prior Publication Data
US 2009/0158900 A1 Jun. 25, 2009

(30) Foreign Application Priority Data
Dec. 21, 2007 (DE) .................. 20 2007 017 867 U

(51) Int. Cl.
*H02G 1/12* (2006.01)
(52) U.S. Cl. .................. 81/9.41; 30/90.1; 81/9.43
(58) Field of Classification Search .............. 81/9.4, 81/9.41–9.44; 30/90.1, 91.1, 91.2
See application file for complete search history.

(56) References Cited

U.S. PATENT DOCUMENTS

| 3,596,541 | A | * | 8/1971 | Bieganski | 81/9.43 |
| 3,703,840 | A | * | 11/1972 | Kauf | 30/90.1 |
| 4,197,768 | A | * | 4/1980 | Undin | 81/9.43 |
| 5,572,911 | A |   | 11/1996 | Schmode | |
| 6,089,125 | A | * | 7/2000 | Cheng | 81/9.44 |
| 6,895,836 | B2 |  | 5/2005 | Hetlund | |

FOREIGN PATENT DOCUMENTS

DE 44 20 050 C1 8/1995

* cited by examiner

*Primary Examiner*—Hadi Shakeri
(74) *Attorney, Agent, or Firm*—Lawrence E. Laubscher, Sr.; Lawrence E. Laubscher, Jr.

(57) ABSTRACT

A pliers-type insulation stripping tool includes an adjusting device for adjusting the cutting profile provided by the knife edges of a stack of parallel lamellar cutting blades pivotally connected at one end with a knife holder for independent pivotal movement about a first pivot axis parallel with the tool handle pivot axis. The knife holder is connected for longitudinal displacement on one the clamping jaws of the tool handles, thereby to remove a severed length of the insulation layer from the insulated conductor.

7 Claims, 3 Drawing Sheets

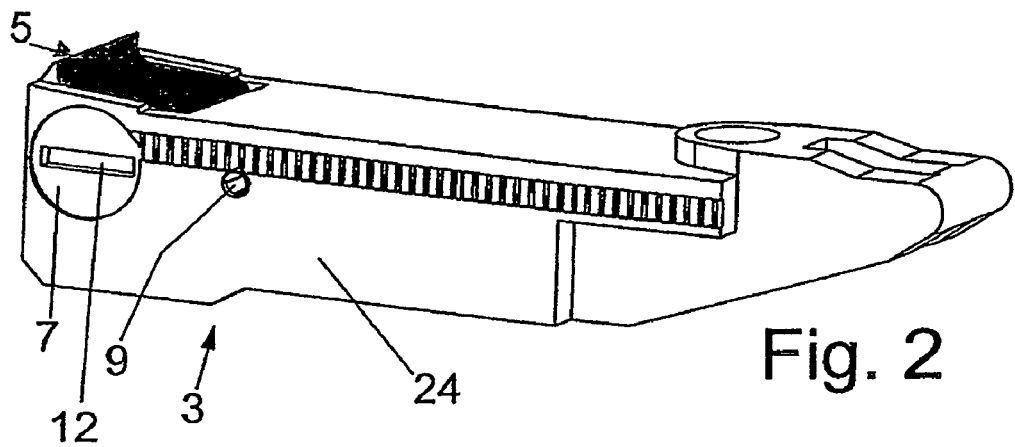
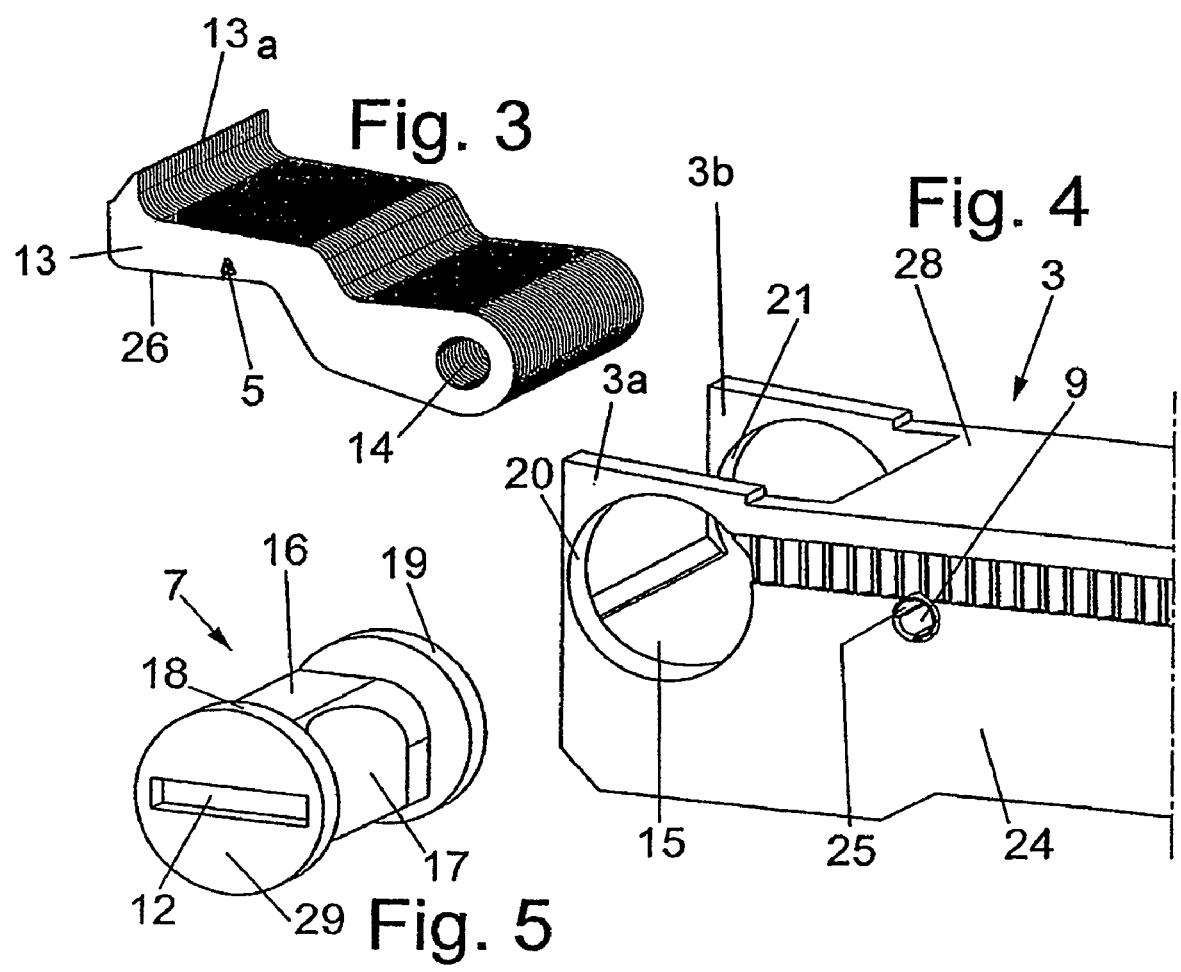

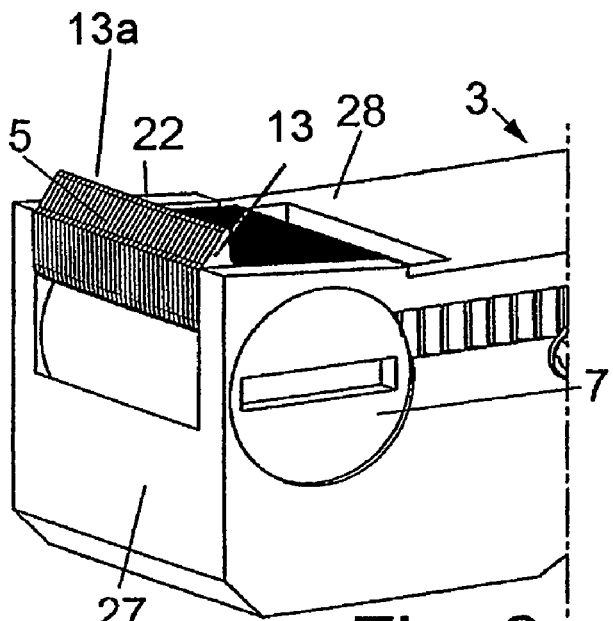
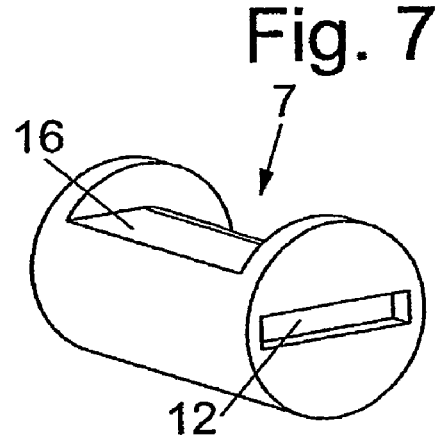
Fig. 6
Fig. 7
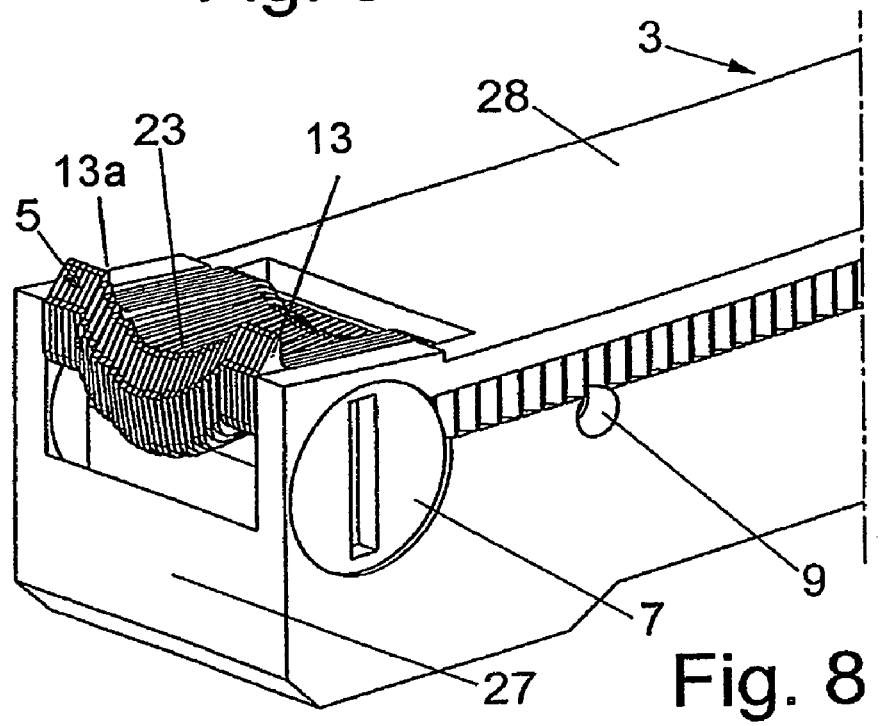
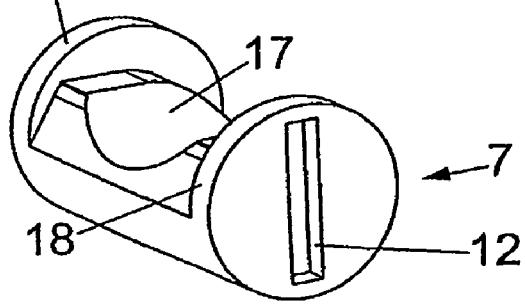
Fig. 8
Fig. 9

INSULATION STRIPPING TOOL

BACKGROUND OF THE INVENTION

1. Field of the Invention

A pliers-type insulation stripping tool includes an adjusting device for adjusting the cutting profile provided by the knife edges of a stack of parallel lamellar cutting blades pivotally connected at one end with a knife holder for independent pivotal movement about a common pivot axis.

2. Description of Related Art

Various types of insulation stripping tools are well known in the prior art, as shown, for example, by the U.S. patents to Schmode et al U.S. Pat. No. 5,572,911 and Hetland et al U.S. Pat. No. 6,895,836. The operability of the design, shown and described therein, has definitely been proven in practice. The insulating-stripping means is so shaped that tool-insulating members are arranged between a mouth formed by clamping jaws and that are arranged movably in the longitudinal mouth direction. The insulation members have a packet consisting of side-by-side lamellae with cutting edges, whereby on the reverse side of the lamellae packet, there adjoins a lamella guide device that is adapted to the profile of a conductor.

The disadvantage inherent in this insulating tool is represented by the fact that, for different cable or insulating layer thicknesses, one must build a lamella guide device that will be adapted to the particular profile of a conductor into the insulating tool in order to ensure optimum insulation or to prevent a separation of the cable or only partial insulation due to a lamella guide device that does not fit in with the particular cable cross-section.

The present invention was developed to provide an insulation stripping tool that will be suitable for the insulation of cables when working with the most widely differing cable cross-sections.

Using the invention-based insulating tool, one can easily adapt the insulating-stripping tool to a particular conductor cross-section with the help of the variable adjustable knife support cylinder.

SUMMARY OF THE INVENTION

Accordingly, a primary object of the present invention is to provide an insulation stripping tool including adjusting means for adjusting the cutting profile provided by the knife edges of a plurality of lamellar cutting blades supported by at least one of two knife holders that are respectively mounted for longitudinal displacement on the clamping jaws of a pair of pivotally-connected pliers-type handles.

According to a more specific object of the invention, the cutting blades are pivotally connected with the knife holder for displacement about a common pivot axis parallel with the handle pivot axis, and the adjusting device comprises a cylindrical support member that is mounted for rotation in the associated knife holder about an axis parallel with the common axis. The circumferential surface of the support cylinder includes a plurality of segments that are alternately engaged by flat portions of the cutting blades, thereby to define different cutting profiles, respectively. Thus, the segments on the circumferential surface of the cylindrical support member can selectively produce linear, concave and angular cutting profiles.

According to a further object, the knife support cylinder lies securely in the knife holder by virtue of the arrangement of the knife support cylinder and of the lamellar cutting blades in the knife holder as well as the shape of the knife support and of the cutting blade lamellae. Moreover, the knife support cylinder can easily be removed from the knife holder for replacement by virtue of this arrangement. In the case of tables with a particular conductor cross-section geometry, one can thus, working with the insulation stripping tool of the present invention in a very simple manner, exchange a knife support cylinder designed for the usual conductor cross-section geometries with a knife support cylinder that is adapted to this special geometry.

BRIEF DESCRIPTION OF THE DRAWINGS

Other objects and advantages of the invention will become apparent from a study of the following specification, when viewed in the light of the accompanying drawing, in which:

FIG. 2 is a perspective view of one of the knife holders of FIG. 1;

FIG. 3 is a perspective view of the lamellar cutting blade means of FIG. 2;

FIG. 4 is a perspective view of the front portion of the knife holder of FIG. 2 when in the disassembled condition;

FIG. 5 is a first side perspective view of the blade support cylinder of FIG. 2;

FIG. 6 is a detailed view of the forward end of the knife holder when in the assembled condition, and with the blade support cylinder positioned to cause the blade knife edges to define a linear first cutting profile;

FIG. 7 is a side perspective view of the blade support cylinder when in the position shown in FIG. 6;

FIG. 8 is a detailed view of the forward end of the knife holder with the blade support member rotated through 90° to cause the blade knife edges to define a concave configuration; and FIG. 9 is a side view of the knife support member when in the position shown in FIG. 8.

DETAILED DESCRIPTION OF THE INVENTION

Figure 1:
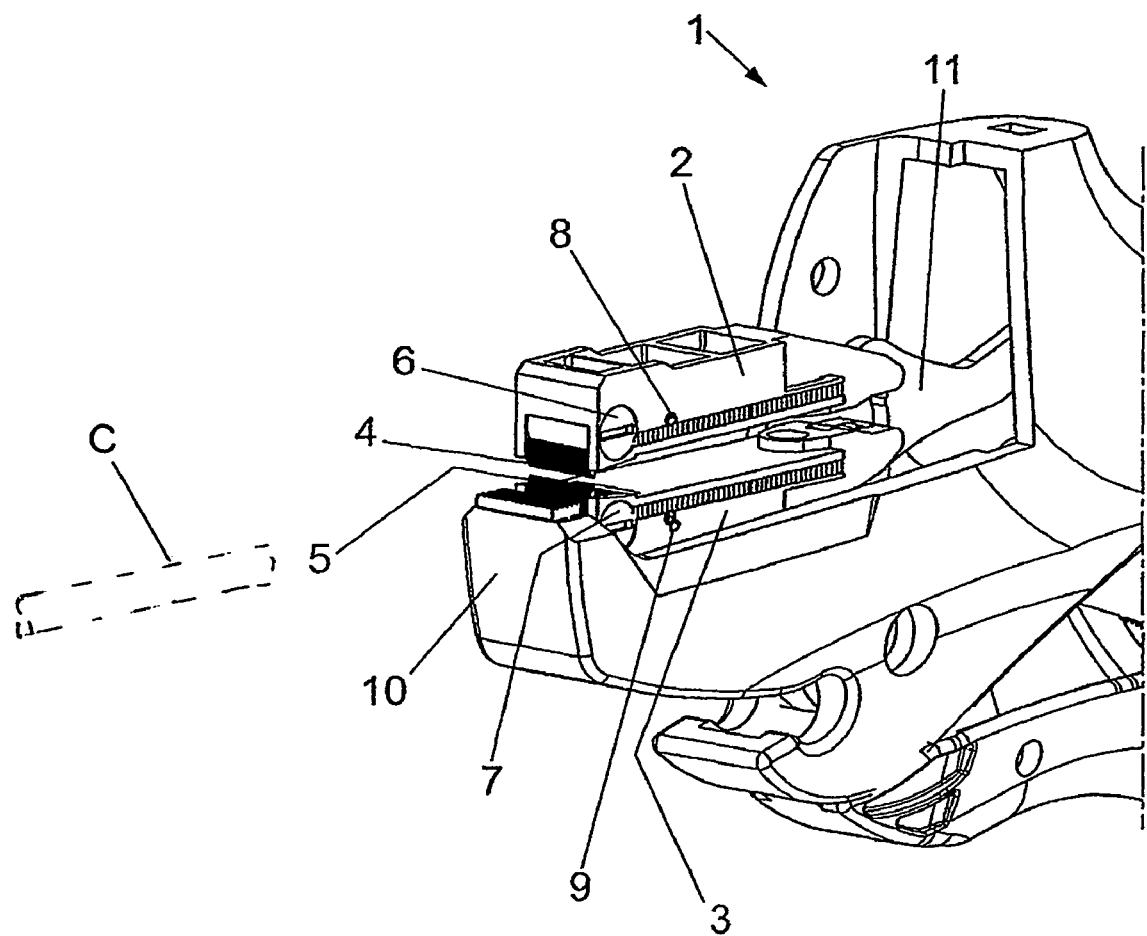
FIG. 1 is a detailed perspective view of the clamping jaw forward end of a pliers-type insulation stripping tool, with certain parts removed for purpose of illustration.

Referring first more particularly to FIG. 1, the pliers-type insulation stripping tool 1 is operable to cut a length of insulation from an insulated conductor C and to strip the severed length of insulation from the conductor. As is customary in the art, a pair of pivotally connected handles include a lower clamping jaw 10 that carries a longitudinally displaceable lower knife holder 3, and an upper clamping jaw (not shown, for purposes of illustration) that carries an opposed longitudinally displaceable upper knife holder 2. The handles are normally resiliently biased apart by spring means (not shown) toward an open condition in which the clamping jaws are separated, thereby to receive longitudinally the end of the conductor C that is to be stripped. The handles are initially manually pivoted together to displace the upper and lower knife means 4 and 5 carried by the knife holders toward an insulation-cutting position, thereby to sever a desired length of the insulation layer on the conductor. Upon further displacement together of the handles, the knife holders 2 and 3 are linearly displaced by the retraction rod 11 and the associated retraction linkage (not shown), whereby the severed insulation layer is separated longitudinally from the conductor by the edges of the knife means 4 and 5.

Referring now to FIGS. 2-5, the lower knife holder 3 contains at its forward end a recess that defines between a pair of side walls 3a and 3b an opening that receives the lower knife blade means 5. The knife blade means 5 comprises a stack of lamellar cutting blades 13 that are individually pivotally connected with the knife holder 3 by a pivot pin 9 that extends between opposed openings 25 contained in the knife holder side walls, and through aligned openings 14 contained in the lamellar cutting blades 13. The cutting blades 13 have knife edges 13a that extend upwardly from the upper sides thereof, and corresponding flat surfaces 26 on their lower sides that engage and are independently supported by the circumferential surface of a cylindrical knife blade support member 7. The knife blade support member includes at its opposite ends circular flange portions 18 and 19 that are rotatably and removably supported in opposed openings 20 and 21 that are contained in the knife holder side walls 3a and 3b, respectively.

As best shown in FIG. 5, the circumferential surface of the knife blade support member 7 includes a flat segment 16, and a curved concave surface 17 displaced 90° from the flat segment 16. The end surface 29 of the circular flange portion 18 contains a diametrically extending slot 12 for receiving the tip of an adjusting tool, such as a screwdriver. Referring to FIGS. 6 and 7, it will be seen that when the knife support member is positioned with the slot 12 arranged horizontally so that the flat surface 16 is uppermost and horizontal, the flat surfaces 26 of the cutting blades are in engagement with the flat surface 16, thereby to cause the knife edges 13a of the individual cutting blades 13 to define a linear cutting profile 22. When the cylindrical knife support member is rotated by the tip of a screwdriver or the like through an angle of 90° to the position shown in FIGS. 8 and 9, the individual knife blades are supported by the concave recess 17 contained in the circumference of the cylindrical support member, thereby causing the knife edges 13a of the cutting blades to define a concave cutting profile 23. In this manner, the cutting profile of the knife edges of the cutting blades may be selected to correspond with the cross-sectional configuration and/or size of the insulated conductor C from which the insulation layer is to be stripped. Thus, a number of segments may be circumferentially arranged on the cylindrical knife support to produce selected linear, concave, convex or angular cutting profiles, and since the cylindrical knife support member is removably mounted in the knife holder openings 20 and 21, various additional knife support members may be provided to produce numerous cutting profiles of various configurations and sizes, as desired. It is apparent that the cutting profile of the upper knife means 4 may be similarly adjusted by rotation of the upper knife blade cylinder 6. If desired, resilient means may be provided for biasing the knife blades toward their respective knife holder members.

While in accordance with the provisions of the Patent Statutes the preferred forms and embodiments of the invention have been illustrated and described, it will be apparent to those skilled in the art that changes may be made without deviating from the invention described above.

What is claimed is:

1. A knife arrangement for a pliers-type insulation stripping tool operable to strip the outer insulation layer from an insulated conductor, said stripping tool including a pair of pivotally-connected handles having adjacent clamping jaw portions, comprising:

(a) knife holder means including a pair of opposed generally parallel knife holders (2, 3) respectively connected with said stripping tool jaw portions for initial displacement by said jaw portions between a separated disengaged position and an adjacent insulation-cutting position, and for subsequent longitudinal displacement relative to said jaw portions from said insulation-cutting position toward an insulation-stripping position;

(b) a pair of opposed knives (4, 5) respectively carried by said knife holders and extending toward each other from the adjacent surfaces of said knife holders, at least one of said knives comprising a stack of parallel lamellar cutting blades (13) each connected for independent pivotal displacement relative to the associated knife holder, said cutting blades having knife edges (13a) arranged to define a first cutting profile, said lamellar cutting blades being connected with the associated knife holder for pivotal displacement about a first pivot axis (9) parallel with the tool handle pivot axis; and (c) blade adjustment mechanism (6, 7) for adjusting the positions of said cutting blades relative to the associated knife holder to define a second cutting profile corresponding with the cross-sectional configuration of the insulated conductor, said blade adjustment mechanism including a generally cylindrical blade support member (6, 7) mounted for rotation about an axis parallel with said first pivot axis, said support members having a circumferential surface arranged to support said cutting blades, said blade support member circumferential surface including a plurality of support segments (16, 17) for defining different cutting profiles, respectively.

2. A knife arrangement as defined in claim 1, wherein one of said support segments (16) is planar, thereby to produce a linear arrangement of the cutting edges of said cutting blades.

3. A knife arrangement as defined in claim 1, wherein one of said support segments (17) is concave, thereby to produce a concave arrangement of the cutting edges of said cutting blades.

4. A knife arrangement as defined in claim 1, wherein one of said support segments includes angular walls, thereby causing said cutting blade edges to define an angular profile.

5. A knife arrangement as defined in claim 1, wherein said cylindrical blade support member has an end surface that contains a slit (12) for receiving the tip of an adjusting screwdriver.

6. A knife arrangement as defined in claim 1, wherein said cutting blades include corresponding flat surfaces (26) arranged for engagement with the circumferential surface of said blade support member.

7. A knife arrangement as defined in claim 1, wherein said cylindrical blade support member includes circular end flange portions (18, 19) rotatably and removably mounted in corresponding side wall bores contained in the knife holder, thereby to permit the substitution of different blade support members to produce different cutting profiles.

* * * * *